United States Patent
Ebrahimi et al.

(10) Patent No.: US 7,334,257 B1
(45) Date of Patent: Feb. 19, 2008

(54) TECHNIQUES FOR PRESERVING CONTENT DURING A REDIRECTION FOR AUTHENTICATION

(75) Inventors: Hashem Mohammad Ebrahimi, Salt Lake City, UT (US); Baber Amin, Provo, UT (US); Stephen R Carter, Spanish Fork, UT (US); Scott William Pathakis, Sandy, UT (US); Robert Skousen Stilmar, Payson, UT (US)

(73) Assignee: Novell, Inc., Provo, UT (US)

( * ) Notice: Subject to any disclaimer, the term of this patent is extended or adjusted under 35 U.S.C. 154(b) by 771 days.

(21) Appl. No.: 10/698,303

(22) Filed: Oct. 31, 2003

(51) Int. Cl.
*G06F 7/04* (2006.01)
*G06F 17/30* (2006.01)
*H04L 9/00* (2006.01)

(52) U.S. Cl. .............. 726/3; 726/27; 726/28; 726/29; 726/30; 713/168; 713/169; 713/170; 380/255

(58) Field of Classification Search .............. 726/3
See application file for complete search history.

(56) References Cited

U.S. PATENT DOCUMENTS

| | | | |
|---|---|---|---|
| 6,438,125 B1 | 8/2002 | Brothers | 370/352 |
| 6,480,887 B1 | 11/2002 | Hayama | 709/217 |
| 6,560,639 B1 | 5/2003 | Dan et al. | 709/218 |
| 6,604,106 B1 * | 8/2003 | Bodin et al. | 707/101 |
| 6,871,220 B1 * | 3/2005 | Rajan et al. | 709/218 |
| 6,985,936 B2 * | 1/2006 | Agarwalla et al. | 709/221 |
| 2003/0167317 A1 * | 9/2003 | Deen et al. | 709/219 |
| 2005/0055434 A1 * | 3/2005 | Burrows et al. | 709/224 |

* cited by examiner

*Primary Examiner*—Ayaz Sheikh
*Assistant Examiner*—Longbit Chai
(74) *Attorney, Agent, or Firm*—Schwegman, Lundberg & Woessner, P.A.

(57) ABSTRACT

Techniques are provided for preserving content during a network transaction. A client issues a content-bearing request to a desired service. At the time the request is issued, the client is not authenticated to the service. The content associated with the content-bearing request is preserved and associated with a modified request. The modified request and a redirection to an authentication service are sent to the client. The client authenticates and transparently sends the modified request. The modified request is used for reacquiring the content. The content-bearing request along with the content are sent to the desired service for processing.

13 Claims, 3 Drawing Sheets

TECHNIQUES FOR PRESERVING CONTENT DURING A REDIRECTION FOR AUTHENTICATION

FIELD OF THE INVENTION

The invention relates generally to network processing, and more specifically to techniques for preserving content during a network redirection for authentication.

BACKGROUND OF THE INVENTION

Many automated transactions that occur over the Internet require an end-user to provide content in order to complete the transactions. Sometimes, this content is represented as fielded data associated with an electronic form. Form-based transactions are omnipresent on the Internet and they are used for a variety of purposes, such as obtaining support for a product, acquiring goods or services, obtaining information about goods or services, and the like.

For example, when a user requests information from an organization over the Internet using a World-Wide Web (WWW) browser, the user may be presented with a Hypertext Markup Language (HTML) browser page (e.g., form) that requires the user to fill in a number of required fields, such as name, address, phone number, and electronic mail (email) address. Some of these forms can be lengthy and require a non-substantial amount of user input and interaction.

Once a form is filled in and includes the proper user-supplied content, which is typically manually supplied by a user, the form is submitted for processing to an automated service that is the object of that form. Unfortunately, if the user is not registered with the automated service or has failed to properly log into the service, then the service will not recognize the request to process the content and will redirect the user to an authentication service for proper authentication.

When this authentication redirection takes place, the user-supplied content is not retained during the redirection. Correspondingly, once the user is properly authenticated for accessing the service, the user is forced to manually re-enter all the content that he/she has already supplied but which has now been lost. This is frustrating, time consuming, often unnecessary, and not user friendly.

Conventionally, when a user obtains a form that is used to gather data (content) for a service, and that form includes an operation which when selected performs a content-bearing operation using the content, the content is lost if the user has not been properly authenticated before executing the operation. Essentially, conventional techniques abandon the form content supplied by an unauthenticated user and redirect the user to an authentication service for initial authentication or for re-authentication if an authenticated session has timed-out. Consequently, after authentication the user must manually re-fill out the form and re-supply the content a second time before achieving the desired content-bearing operation with his/her content.

The loss of content during an authentication redirection is particularly noticeable with Internet transactions occurring with Hyper Text Transfer Protocol (HTTP) communications and operations. A HTTP redirection transparently occurs when redirection-supported operations, such as GETs are used. However, there are several HTTP operations which do not natively support redirection; some such operations include PUTs, GETs, World Wide Web Distributed Authoring and Versioning operations (WebDAVs), and others.

Thus, a content-gathering form represented in a WWW browser as an HTML browser page which includes one of these operations (e.g., PUT, POST, or WebDAVs) will not preserve any user-supplied content before redirecting a non-authenticated user to an authentication service. These operations (e.g., PUT, POST, or WebDAVs) simply ignore a non-authenticated user's content and redirect the user to an authentication service. After authentication, the user must manually reenter his/her content and reprocess the PUT, POST, or WebDAV.

Thus, improved techniques for preserving content during a redirection for authentication are needed.

SUMMARY OF THE INVENTION

In various embodiments of the invention, techniques are presented for preserving content during a redirection for authentication. A non-authenticated client issues a content-bearing request for a service. The content associated with the request is preserved and the client is redirected for authentication. After being authenticated, the client transparently reissues a modified request which is used to reacquire the content originally associated with the content-bearing request. Next, the modified request and content are sent to the desired service for processing.

More specifically, and in one embodiment of the invention, a method for preserving content is presented. A request having content is received from a non-authenticated client. The request is modified and associated with the content. The non-authenticated client is redirected to an authentication service and the modified request is sent to the client. The modified request is received from an authenticated client and the content is reacquired using the modified request.

In another embodiment of the invention, another method for preserving content is described. A content-bearing request is issued to a service. A modified request and a redirection for authentication are received. The redirection is used for authenticating with an authentication service. Next, the modified request is issued to the service.

In still another embodiment of the invention, a content-preserving system is provided. The content-preserving system includes a desired service and a proxy. A client issues a content-bearing request to the desired service and the proxy detects that the client is not authenticated to the desired service. The proxy preserves content associated with the content-bearing request, redirects the client to an authentication service, and directs the client to issue a modified request after being authenticated. The proxy uses the modified request to reacquire the content and submit the original content-bearing request to the desired service, once the client is authenticated.

In yet another embodiment of the invention, a content-preserving data structure is presented. The content-preserving data structure includes and original request data structure, instruction data, and modified request data. The original request data structure is associated with an original content-bearing request made for a desired service and issued from a client. The instruction data is for reacquiring content associated with the original content-bearing request. Moreover, the modified request data includes the original request along with the instruction data.

DETAILED DESCRIPTION OF THE INVENTION

Figure 1:
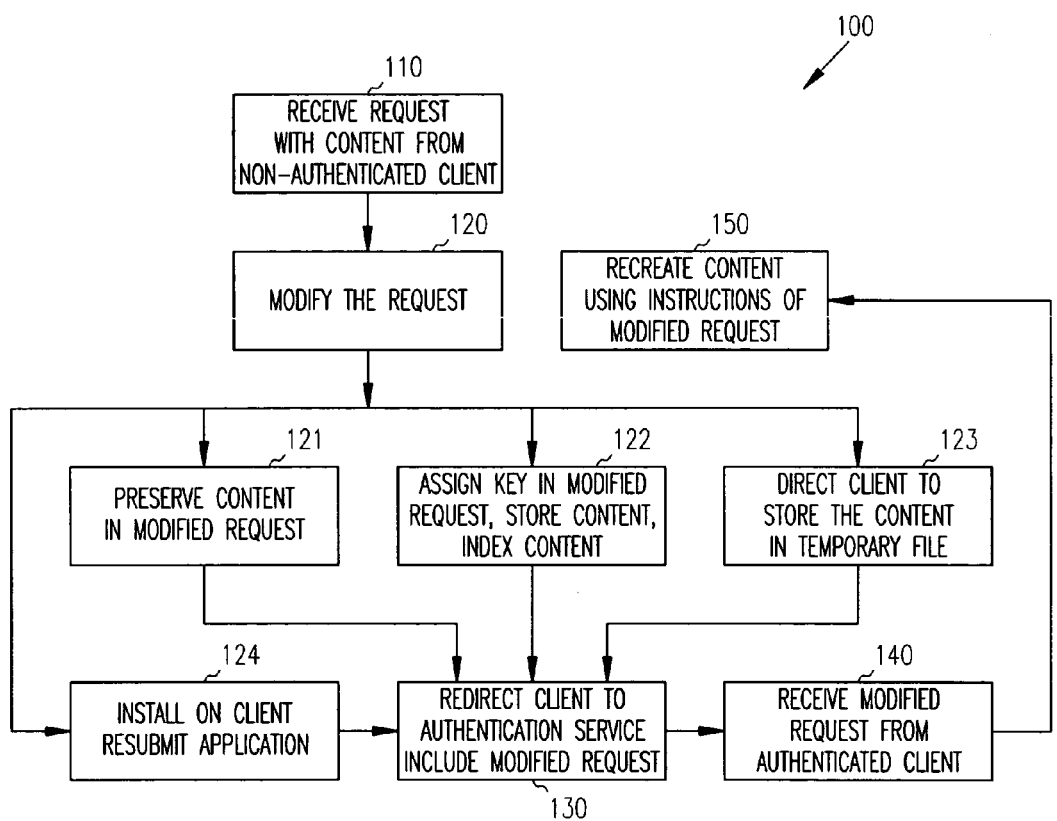
FIG. 1 is a flowchart representing a method for preserving content.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the terms "service" and "application" are used. A service can include one or more applications acting in cooperation with one another as a system or a service can include a single application. Thus, as used herein service and application are used interchangeably. Moreover, as used herein, the term "proxy" can be a service as well. A proxy is designated as such by the function that it is performing. That is, a proxy performs one or more operations on behalf of or for the benefit of another service and/or client. In some embodiments, the proxy is included as a front-end interface of a desired service.

A "content-bearing" request is a type of request that includes content. In some embodiments, content-bearing requests are HTTP PUT, POST, or WebDAVs associated with forms used in a WWW browser over the Internet with HTTP or HTTPS (HTTP over a secure socket layer (SSL)) communications. However, a content-bearing request can be any network request issued to a desired content-processing service, where the request includes content and the request has not yet been authenticated for access to the service. Under these circumstances, the client associated with the request needs to be authenticated before the content-bearing request can be processed by the service.

With the teachings of this invention, redirection for authentication occurs in a conventional manner, but unlike conventional approaches the content associated with the original content-bearing request is not lost and is transparently recovered after authentication is established. As one of ordinary skill in the art will realize upon reading and comprehending this disclosure, this provides improved usability and convenience for users interacting with content-based services.

Moreover, a "client" as used herein refers to an application, machine, device, electronic resource, or user that issues a content-bearing request to a desired service. The client may directly or indirectly interact with other services or applications in constructing and issuing the request. Moreover, the desired service requires an authenticated client before the content associated with the content-bearing request can be processed. In some embodiments, the client interacts with a WWW browser to access a browser page associated with the desired service, that browser page is a form which requires content and includes a content operation, such as a HTTP POST, PUT, or WebDAV. The client supplies content to the populate fields of the form and activates the content operation, before the client is authenticated to the desired service.

In one embodiment of this invention, the techniques presented herein for preserving content during a redirection for authentication are implemented within proxies, network servers, or other network configurations and products. For example, in one embodiment, the teachings presented herein are implemented within an iChain, Excelerator, or Border Manger product, distributed by Novell, Inc., of Provo, Utah. Of course other network configurations or services, existing or custom-developed, can be used with the teachings presented herein and realize the benefits associated therewith.

FIG. 1 is a flowchart representing one method 100 for preserving content. The method 100 is implemented as one or more applications or services residing in a computer-accessible medium. In one embodiment, the method 100 is implemented within a proxy server, network server, or WWW server. The method 100 need not be in operation, but when the method 100 is operational it performs the following techniques for preserving content during a network transaction where authentication has not yet occurred when content is initially received.

Conventionally, it is common during a network transaction to recognize a client's non-authenticated attempt for a desired service. When this non-authenticated attempt is detected, it is also common to redirect the client to an authentication service acting on behalf of the desired service for purposes of authenticating the client before access is given to that desired service. These redirection techniques are well known to one or ordinary skill in the networking arts.

However, conventionally HTTP redirection is affected by the operation being requested by the client. That is, with content-bearing requests originating from a non-authenticated client, the content associated with those requests is lost when the client is redirected for authentication. The teachings of this invention solve this problem and preserve that content during redirection, without altering conventional network protocols in order to achieve the same.

At 110, a content-bearing request is received from a non-authenticated client. In one embodiment, the client generates the request within a browser by supplying content to a form and activating a content-processing operation, such as an HTTP PUT, POST, or WebDAV. The client, in activating the operation, has unknowingly generated or produced a content-bearing request that is directed to a desired service. The desired service is the service that receives as input the client supplied content and performs operation(s) on the same. But, the desired service will not process the operation for unrecognized or non-authenticated clients. With this invention, the client is not authenticated when the first and content-bearing request is generated and sent to the desired service.

Accordingly, at 120, the content-bearing request is intercepted by the processing of the method 100 on behalf of the desired service or sent to the processing of the method 100 by the desired service. In a conventional scenario, the client would be automatically redirected to an authentication service for authentication and the client supplied content associated with the content-bearing request would be ignored and lost. With embodiments, of this invention before the client is redirected to the authentication service for authentication, the content is preserved and transparently recaptured after authentication in the following ways.

At 120, the original content-bearing request is modified, such that the original client-supplied content can be recaptured after authentication from the modified request. In one embodiment, the content and headers of the original content-bearing request are preserved at 121. Optionally, preservation can be achieved by compressing or encrypting the content and headers within the modified request. The compressed or encrypted content can be recaptured by decompression or decryption when needed. In other embodiments, the content and headers of the original content-bearing request need not be compressed or encrypted within the modified request. The compressed, encrypted, or native (unaltered) content can be located or described within the modified request with a variety of techniques.

For example, the content can be placed on a Uniform Resource Identifier (URI) or Uniform Resource Locator (URL). This location for the content is advantageous within the modified request, because URLs are usually passed through without change during network transactions. Yet, if the content is particularly large and is not compressed, then data truncation may occur.

In another example, the content can be placed in an HTTP header. One location within the header can be an X-Header. This is advantageous since X-Headers are usually passed on with network transactions without modification. This makes an X-Header a particular good location within the HTTP header to include the content. However, some services may strip unidentified X-Headers. As a result, the header used for content can be registered with Internet and Engineering Task Force (IETF) organization, this allows services to recognize, accept, and rely on the HTTP header being used for housing the content.

In still other examples, the content itself need not physically reside within the modified request that is generated at 120. That is the modified request may include instructions or keys that can be subsequently used to direct the recapturing or reacquiring of the original client-supplied content.

For example, at 122, the content can be cached or stored within memory or storage that is accessible to the processing of the method 100. The content can be reacquired from the memory or storage using a combination of keying and indexing techniques. For example, the content can be indexed within storage or memory based on the client's Internet Protocol (IP) address, client identifier, and the like. The technique used for naming or indexing the content within the storage or memory can be represented as a token that is included within the modified request. In this way, the proper content can be reacquired when needed after the client has been properly authenticated. Storing the content in memory or storage accessible to the processing of the method 100 may require additional processing when the client is behind a Network Address Translation (NAT) device or when the processing of the method 100 is load balanced by an L4 switch that routes data based on its content type.

As another example, where the content is not directly available from the modified request, the client can be directed at 123 to store the content in memory or storage that is accessible to the client. Thus, the client can be directed before redirection for authentication purposes to save the content in a temporary file, such as a session-based cookie. This may present problems when the client is configured to prevent the use of cookies. Yet, when this is the circumstance, advanced authentication will generally not work either, since most advanced authentication techniques require access to cookies.

Once the modified request includes the content, instructions, or tokens for reacquiring the content, the client can be properly redirected to an authentication service at 130. In one embodiment, before the client is actually redirected to the authentication service, a resubmit application is transparently installed on the client at 124. The resubmit application will assist in the redirection at 130 and immediately following a successful authentication, the resubmit application transmits the modified request back to the processing of the method 100. This is particularly useful when HTTP redirection is not being used or is not available. In these situations, the resubmit application performs the redirection that would typically be handled by an HTTP redirection.

Upon receipt of that modified request, at 140, the processing of the method 100 now knows the client is authenticated and knows that the authenticated client was associated with a previously submitted content-bearing request based on the presence of the modified request. Accordingly, at 150, the modified request is used to reacquire the content and to direct the client to the desired service with the content for further processing. Thus, the content is preserved and the client is redirected, authenticated, and represented to the desired service with the client's content after authentication. There is no need to manually re-supply the content a second time after authentication is achieved.

As was detailed above, the processing of the method 100 can reacquire the content from the modified request in a number of ways, such as by decompressing or decrypting the content from the URL or HTTP header of the modified request, acquiring the content from a client-based cookie, or acquiring the content from memory or storage accessible to the processing of the method 100. The modified request includes the instructions for properly reacquiring the content. Once that content is reacquired, the client is once again redirected back to the service and location where the content was originally supplied and the content is automatically populated there for the client.

At this point the client is authenticated to the desired service, and the client's original supplied content is preserved for the client at the location where the client was before being redirected for authentication. The client can now execute his content-bearing request as it originally was requested and there is no need to manually re-supply that content. In some embodiments, the original content-bearing request is automatically submitted to the desired service after authentication occurs on behalf of the client.

Figure 2:
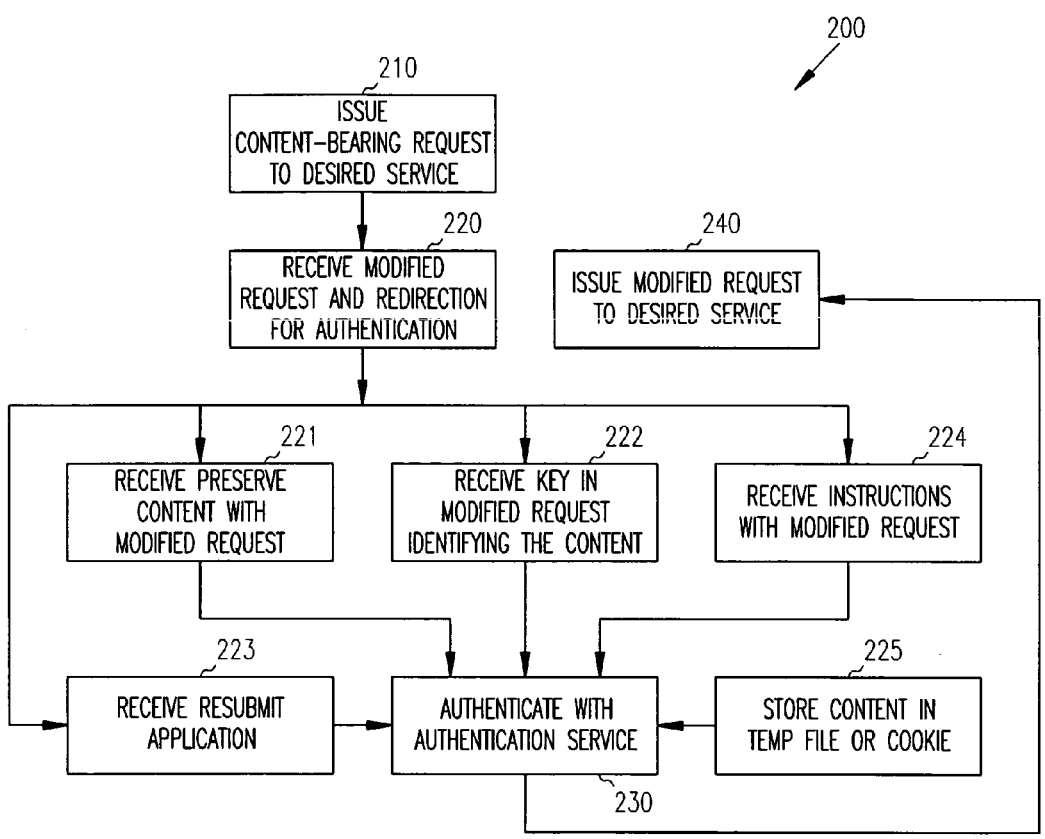
FIG. 2 is a flowchart representing another method for preserving content.

FIG. 2 is a diagram of another method 200 for preserving content. The method 200 is implemented within a computer-readable medium. The method 200 is preformed by one or more applications of a client. In one embodiment, the processing of the method 200 is integrated as applets or scripts within a WWW browser application of the client.

At 210, a content-bearing request is issued for a desired service. In some embodiments, this content-bearing request is associated with content that is initially constructed by interacting with one or more WWW pages within a browser application. These pages represent a data gathering form consumed by the desired service. When the content-bearing request is initially formed, the client has not yet been authenticated to the desired service. When the client activates a content-processing operation on that form, the content-bearing request is formed and issued from the client.

After issuing the content-bearing request, the processing of the method 200 immediately receives a modified request and a redirection request, at 220. The processing of the method 200 need not know the format or specifics of the modified request. The modified request is originally received along with the redirection request from either the desired service or a proxy or other web service that is acting on behalf of the desired service for purposes of authenticating clients before granting access to the desired service.

The actual format and specifics of the modified request can be preserved at 221. In one embodiment, preservation can include a reproduction of the original content in a compressed or encrypted format or as a key that can be used to reacquire the original content as depicted at 222. In some embodiments, the modified request includes instructions for reacquiring the content as depicted at 224. Moreover, in one embodiment, the processing of the method 200 receives a resubmit application at 223. The resubmit application processes within the method 200 and assists in redirecting the processing of the method 200 to an authentication service and subsequent to the authentication automatically and transparently sends the modified request back to the desired service.

At 230, the redirection is used to contact an authentication service for purposes of authenticating the client to the desired service. Immediately after authentication is successfully achieved, the modified request is issued at 240 to the desired service. At this point, the client is now authenticated for accessing the desired service and the modified request includes the instructions or the content necessary to recreate the initial content-bearing request for the service. Thus, the client is placed at a location where the content was initially supplied and the content is redisplayed there for the client. In other embodiments, the original content-bearing request (e.g., PUT, POST, or WebDAV) is automatically sent on behalf of the client to the desired service after authentication is achieved. The original content is preserved and is not lost during the redirection that occurred for purposes of acquiring client authentication. Conventionally, this was not the case, since during redirection for purposes of authentication; the content was lost and not preserved.

Figure 3:
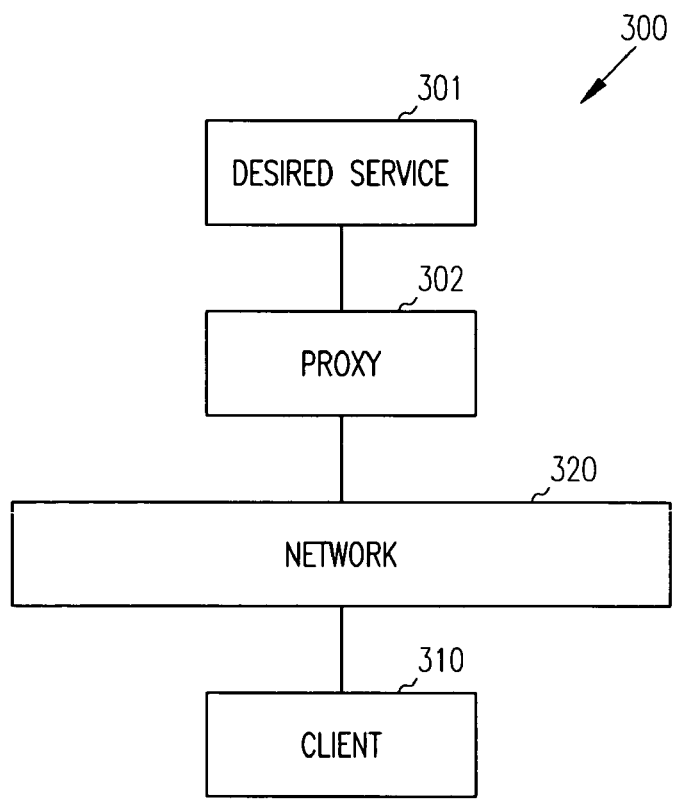
FIG. 3 is a diagram of a content-preserving system.

FIG. 3 is a diagram of one content-preserving system 300. The system 300 is implemented in a computer-readable medium. The system is available over a network 320 and is accessed by one or more clients 310. The system 300 includes a desired service 301 and a proxy 302. The desired service 301 is designed to process content received from a client, and the proxy 302 is designed to act as an intermediary on behalf of the desired service 301. One of the many intermediary tasks that the proxy 302 can perform includes directing and ensuring that a client 310 is authenticated to a desired service 301 before the client 310 is granted access to the desired service 301.

During operation of the system 300, the client 310 uses one or more client applications to access the network 320 for purposes of supply content to the desired service 301. For example, consider a client 310 that processes a WWW browser over the Internet using HTTP or HTTPS communications. If HTTPS communications are used then the proxy 302 can include technology to offload the encryption tasks from the desired service 301 and include technology to create the SSL session. One such product that can provide these features necessary to integrate HTTPS communications is the Secure Excelerator, distributed by Novell, Inc. of Provo, Utah. A proxy 302 that includes a Secure Excelerator can establish the SSL session and offload the encryption tasks occurring between the client 310 and the desired service 301. Thus, in various embodiments of the invention, a proxy 302 enabled with a Secure Excelerator can be used when HTTPS communications are being used.

The client's identity is recognizable as a user identification and password. The client 310 accesses one or more content-gathering WWW browser pages associated with the desired service 301. However, the desired service 301 does not actually include the browser pages; rather, the desired service 301 consumes the data content that is gathered by fields on the browser pages and processes an operation (e.g., PUT, POST, WebDAV, and the like) on the gathered content. Therefore, the desired service 301 is only contacted after the operation (e.g., PUT, POST, WebDAV, and the like) is submitted by the client 310. When the client 310 selects or activates that operation, the identity of the operation and the client-supplied content combine to form a content-bearing request to the desired service 301.

Continuing with the present example, the proxy 302 is interposed between the client 310 and the desired service 301, such that when a content-bearing request is sent from the client 310 to the desired service 301, the proxy 302 intercepts or receives that content-bearing request. The proxy 302 determines the identity of the client 310 and notes that the client 310 is not authenticated to access the desired service 301. In other embodiments, the proxy 302 does not ascertain the identity of the client 310; rather, the proxy 302 sends the content-bearing request to the desired service 301, and the desired service 301 sends back to the proxy 302 an authentication redirection. In these embodiments, the proxy 302 need not be aware of the client's identity.

Conventionally, at this point, a proxy sends a redirection request back to a client, which directs the client to an authentication service for purposes of authenticating to a desired service. In a conventional scenario, the content associated with the content-bearing request is lost and not maintained during this redirection. However, with the teachings of this invention, the content is preserved and re-supplied when needed after a redirection for purposes of authenticating the client 310.

After the proxy 302 determines that the desired service 301 requires a redirection in response to a content-bearing request because the content-bearing request is associated with a non-authenticated client, the proxy 302 identifies the request made from the client 310 as a content-bearing (e.g., PUT, POST, or WebDAV) request having associated content. In the present example, this is can be achieved by recognizing that the operation that the client 310 is attempting to perform is a PUT, POST or WebDAV operation. The proxy 302 then takes steps to preserve the associated content before issuing the redirection back to the client 310 for purposes of authenticating with an authentication service.

The proxy 302 can preserve the content in a variety of ways. For example, the proxy can store the content in its cache or other storage and index that content within the cache or storage based on an identifier associated with the client 310. The proxy 302 can also direct the client 310 to retain the content in a temporary file, such as a cookie. Alternatively, the proxy 302 can compress or encrypt the content and affix it to an URL or HTTP header that is then sent back to the client 310 for later use after authentication is successfully established.

The technique used by the proxy 302 in preserving the content can be identified in a modified request that is sent back to the client 310 with the redirection request. The modified request includes the content or instructions on how to reacquire the content after the client 310 is authenticated to the desired service 301. In one embodiment, a resubmit application, script, or applet is also included with the modified request and processed. The resubmit application directs the client 310 to the authentication service for authentication and after authentication is successful, automatically and transparently resends from the client 310 to the proxy 302 the modified request.

When the proxy 302 receives the modified request back from the client 310, the client 310 is now authenticated for accessing the desired service 301. Thus, the proxy 302 parses the modified request for purposes of determining how and where to acquire the content that was submitted initially with the original content-bearing request. Thus, the proxy 302 may decompress the content from the URL associated with the modified request, decrypt the content from the URL, decompress the content from an HTTP header associated with the modified request, decrypt the content from the HTTP header, use a token from the modified request to locate the content in locally accessible memory or storage, or use a key from the modified request to acquire the content from memory or storage of the client 310.

Once the proxy 302 has reacquired the content for the authenticated client 310, the proxy 302 can redirect the client 310 to automatically and transparently send the original content-bearing request along with the reacquired content to the desired service 301. In some other embodiments, once the proxy 302 has reacquired the content, the client 310 is redirected again back to the original location (e.g., WWW browser page) where the client 310 initially supplied the content, and the content is populated in that location for the client 310. The client 310 can now once again submit the content to the desired service 301 for processing, and does not need to manually re-supply the content.

Figure 4:
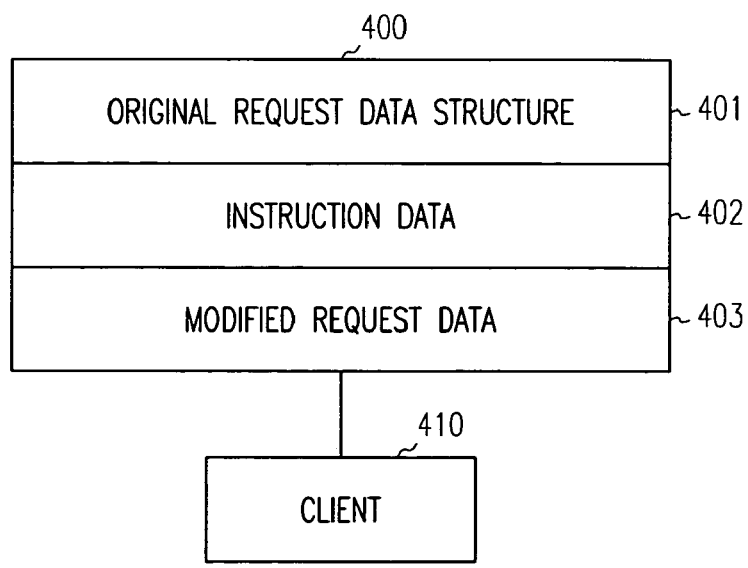
FIG. 4 is a diagram representing a content-preserving data structure.

FIG. 4 is a diagram representing one content-preserving data structure 400. The content-preserving data structure 400 resides in and is accessible from a computer-readable medium. The data structure 400 is used for purposes of preserving content during a client redirection for authentication. The data structure 400 can be consumed by the client, a proxy, or a service involved in content-bearing network transactions.

The content-preserving data structure 400 includes an original request data structure 401, instruction data 402, and modified request data 403. The original request data structure 401 includes at least a portion of an original content-bearing request generated and requested by a client. In some embodiments, the original request data structure 401 includes an URL to a desired service being requested by the client with the content-bearing request.

The instruction data 402 includes directives on how to acquire an original content associated with the original content-bearing request. These instructions 402 can indicate that the content is included in a compressed or encrypted format within the modified request data 403. The instructions 402 can indicate that a token or key can be used to acquire the content from the memory or storage of a proxy or a client 410. The instructions 402 permit the content-preserving data structure 400 to be used for purposes of reacquiring content after a client 410 has been authenticated as a result of redirection.

The modified request data 403 includes the original request data structure 401 and the instructions 402. The modified request data 403 is sent with a redirection from a proxy to the client 410. The modified request data 403 is used after the client 410 has successfully authenticated to a desired service. In some embodiments, the modified request data 403 or another separate data structure also includes a resubmit application that automatically manages submitting the redirection for the client 410 and submitting the modified request data 403 after successful authentication back to the proxy. The proxy acts as an intermediary on behalf of the desired service (e.g., reverse proxy) and/or client 410 (e.g., transparent or forward proxy).

The proxy receives the modified request data 403 and uses the instructions 402 to reacquire the content. Next, the original request data structure 401 is used along with the content to place the client 410 back in a processing state that the client 410 was in before being redirected for authentication. That is, the content originally provided by the client 410 is re-supplied and populated to the appropriate location and the client 410 is placed at that location. Thus, the client 410 was redirected for purposes of being authenticated to a desired service, and the client-provided content is preserved after authentication is completed.

One of ordinary skill in the art now appreciates how content can be preserved during a client redirection for purposes of authenticating the client 410. This is achieved without creating new or modified communication protocol commands and can be achieved within the existing framework used for authentication redirection. The client 410 seamlessly and transparently participates with preserving the content along with a proxy that acts as an intermediary for the desired service.

Although specific embodiments have been illustrated and described herein, one of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for preserving content, comprising:
    receiving a request having content originating from a non-authenticated client, wherein the request is a content-bearing and is issued from the client;
    modifying the request and associating the content with the modified request, wherein the modified request is done to permit the content to be recaptured after the non-authenticated client is authenticated;
    redirecting the non-authenticated client to an authentication service and including the modified request; and
    receiving the modified request from an authenticated client, via a resubmit application transparently installed on the client, and reacquiring the content using the modified request from the client, wherein the content is available from the modified request and does not have to be re-supplied by a user associated with the client after successful authentication.

2. The method of claim 1 wherein the modifying further includes compressing the content within the modified request.

3. The method of claim 1 wherein the modifying further includes directing the non-authenticated client to store the content in a temporary file and identifying the temporary file within the modified request.

4. The method of claim 1 wherein the modifying further includes assigning a key to the modified request, storing the content, and indexing the content based on the key.

5. The method of claim 1 wherein the redirecting further includes installing the resubmit application on the non-authenticated client that transparently transmits the modified request from the client back to the receiving the modified request processing when the non-authenticated client is successfully authenticated.

6. The method of claim 1 further comprising recreating the content based on directions provided in the modified request.

7. The method of claim 1 wherein receiving the request further includes receiving the request as a Uniform Resource Locator (URL) request from a World-Wide Web (WWW) browser on the non-authenticated client, the request received over the Intent using Hyper Text Transfer Protocol (HTTP) communications.

8. A method for preserving content, comprising:
issuing, from a client, a content-bearing request to a service, wherein the content-bearing request originates from the client and is directed to the service;
receiving, at the client, a modified request and a redirection for authentication along with a directive to retain the content at the client, and wherein a resubmit application is also received on the client and is transparently installed on the client, and the resubmit application assists in redirecting to an authentication service and subsequent to the authentication automatically and transparently sends the modified request back to the service, wherein the modified request is done to permit the content to be recaptured after the non-authenticated client is authenticated;
authenticating the client with the authentication service; and
issuing from the client the modified request to the service, the modified request having the content so that the content does not have to again be re-supplied by a user associated with the client after successful authentication.

9. The method of claim 8 wherein the receiving further includes receiving content sent with the content-bearing request in a compressed format within the modified request.

10. The method of claim 8 wherein the receiving further includes receiving instructions with the modified request to store content sent with the content-bearing request in a temporary file.

11. The method of claim 10 wherein receiving the instructions further include storing the content as a cookie.

12. The method of claim 8 wherein the receiving further includes receiving a key associated with content sent with the content-bearing request, wherein the key is subsequently used to reacquire the content.

13. The method of claim 8 wherein issuing the content-bearing request further includes issuing the content bearing request as a Hyper Text Transfer Protocol (HTTP) communication including at least one of a PUT operation and a POST operation.

* * * * *

UNITED STATES PATENT AND TRADEMARK OFFICE
CERTIFICATE OF CORRECTION

| | |
|---|---|
| PATENT NO. | : 7,334,257 B1 |
| APPLICATION NO. | : 10/698303 |
| DATED | : February 19, 2008 |
| INVENTOR(S) | : Ebrahimi et al. |

It is certified that error appears in the above-identified patent and that said Letters Patent is hereby corrected as shown below:

Column 11, line 29, in Claim 7, delete "Intent" and insert -- Internet --, therefor.

Signed and Sealed this

Third Day of June, 2008

JON W. DUDAS
*Director of the United States Patent and Trademark Office*